Feb. 25, 1969          R. M. GOODMAN          3,430,256
SUBMINIATURE DIGITAL RECORDER
Filed March 5, 1968                    Sheet 1 of 4

INVENTOR:
ROBERT M. GOODMAN
BY Howson & Howson
ATTYS.

Feb. 25, 1969    R. M. GOODMAN    3,430,256
SUBMINIATURE DIGITAL RECORDER
Filed March 5, 1968    Sheet 2 of 4

INVENTOR:
ROBERT M. GOODMAN
BY Howson & Howson
ATTYS.

Feb. 25, 1969   R. M. GOODMAN   3,430,256
SUBMINIATURE DIGITAL RECORDER
Filed March 5, 1968

INVENTOR:
ROBERT M. GOODMAN
BY Howson & Howson
ATTYS.

United States Patent Office 3,430,256
Patented Feb. 25, 1969

3,430,256
SUBMINIATURE DIGITAL RECORDER
Robert M. Goodman, Elkins Park, Pa., assignor to The Franklin Institute, Philadelphia, Pa., a corporation of Pennsylvania
Continuation-in-part of application Ser. No. 379,076, June 30, 1964. This application Mar. 5, 1968, Ser. No. 719,815
U.S. Cl. 346—107     21 Claims
Int. Cl. G01d 9/42

ABSTRACT OF THE DISCLOSURE

A recorder apparatus is provided having a source of radiation sensitive material and a receptacle for the material. Drive means is employed for moving the material from the source to the receptacle. A recording head is provided having a plurality of radiation sources for exposing to radiation different areas on the material as the material moves from the source to the receptacle. Transducer means is responsive to a predetermined condition for producing an output signal indicative of the condition. Controlled pulse means is employed which is responsive to the output signal of the transducer means for providing a series of pulses indicative of the condition. The apparatus includes counter means responsive to the series of pulses from the controlled pulse means for providing a series of outputs representative of the number of pulses in the series of pulses. Switch means is provided for selectively connecting the outputs of the counter means to different ones of the radiation sources for representing information indicative of the condition by exposure of the material and having means actuatable to cause the switch means to connect the outputs of the counter means to the radiation sources. Control means is provided for actuating the actuatable means of the switch means and for actuating the drive means to move the material.

---

This application is a continuation-in-part of my application Ser. No. 379,076, filed June 30, 1964, now abandoned.

The present invention relates to a subminiature digital recorder apparatus for making a record of information supplied thereto and more specifically to such a recorder apparatus for making a record on a radiation sensitive material.

In such systems of the class with which the present invention is primarily concerned, it is highly desirable to record data in digital form from a multiplicity of sensed sources. A further desirable feature is to provide a recorder capable of recording information either periodically or at random intervals. It is also desirable to provide these features in a system which makes available an apparatus that is rugged in design, extremely small, simple in operation and which requires a minimum of power to operate.

The subminiature digital recorder apparatus of the present invention may be useful in many applications, such as, clinical medical studies of temperature and heart rate in normal and pathological persons; safety studies in public transportation systems; studies of stressful work effects on personnel; studies by remotely located surveillance and recording systems; and ecological, wild life, and oceanographic studies. The input or inputs to the recorder apparatus may be from a transducer providing a variable resistance output in response to mechanical motion, force, temperature or light. The input to the recorder apparatus may be from a transducer sensing a pulsatile signal generated by a human heart function. The input could also be, for example, a direct voltage from a transducer representative of galvanic skin reflex or a direct voltage from a transducer representative of the rotational position of a human subject's head.

According to the present invention, these objectives are accomplished by having a recording head with a plurality of radiation sources selectively energized for exposing different discrete areas on a radiation sensitive material which is passed by the recording head from a source of radiation sensitive material to a receptacle for the material.

In accordance with the invention, drive means is provided for moving the radiation sensitive material between the source and the receptacle. The drive means preferably moves the radiation sensitive material under the recording head in a step-wise and discontinuous manner.

Transducer means is provided which is responsive to a predetermined condition for producing an output signal indicative of the condition. Controlled pulse means is employed and is responsive to the output signal of the transducer means for providing a series of pulses indicative of the condition. The recorder includes counter means which is responsive to the series of pulses from the controlled pulse means for providing a series of outputs representative of the number of pulses in the series. Switch means is provided for selectively connecting the outputs of the counter means to different ones of the radiation sources for representing information indicative of the condition by exposure of the material. The switch means has means actuatable to cause the switch means to connect the outputs of the counter means to the radiation sources. Preferably, control circuit means is employed for actuating the actuatable means of the switch means and for actuating the drive means to move the material.

The recorder apparatus of the present invention may be employed to record more than one input parameter simultaneously in a recording operation, or sequentially in recording operations. For example, in a recorder apparatus having the elements described above, a second input parameter could be recorded simultaneously by addition of the following further elements. A second transducer means would be provided which is responsive to a second predetermined condition for producing a second output signal indicative of the second condition. Second controlled pulse means would be provided which is responsive to the second output signal of the second transducer means for providing a second series of pulses indicative of the second condition. The counter means of the recorder could have a first portion and a second portion. The first portion of the counter means would be responsive to the series of pulses from the first-mentioned controlled pulse means for providing a series of outputs representative of the number of pulses in the first-mentioned series. The second portion of the counter means would be responsive to the second series of pulses from the second controlled pulse means for providing a series of outputs representative of the number of pulses in the second series. The switch means connects all of the outputs of the counter means to different ones of the radiation sources for representing information indicative of the first-mentioned condition and the second condition.

Preferably, the control circuit means includes timer means for determining the interval at which a recording will be made and the period for receiving information relative to the condition. The recorder apparatus further includes gate means connected between the controlled pulse means and counter means and has gate control means actuatable to cause the gate means to connect the controlled pulse means to the counter means. The timer means provides a signal at the desired interval to actuate the gate control means of the gate means, to actuate the control means of the switch means, and to actuate the drive means to move the radiation sensitive material.

The radiation sources may be arranged in the recording head in a linear array to traverse the direction of travel of the radiation sensitive material, whereby the radiation from the radiation sources expose bits of channels on the radiation sensitive material defined by the radiation sources.

For a better understanding of the present invention, reference is made to the following drawings wherein.

The subminiature digital recorder apparatus of the present invention has three main portions, a recorder section, a power supply section and an electronic circuitry section. The recorder section will be discussed first, followed by a discussion of the power supply and electronic circuitry for actuating the recorder to make a record of information indicative of a predetermined condition or conditions.

Figure 1:
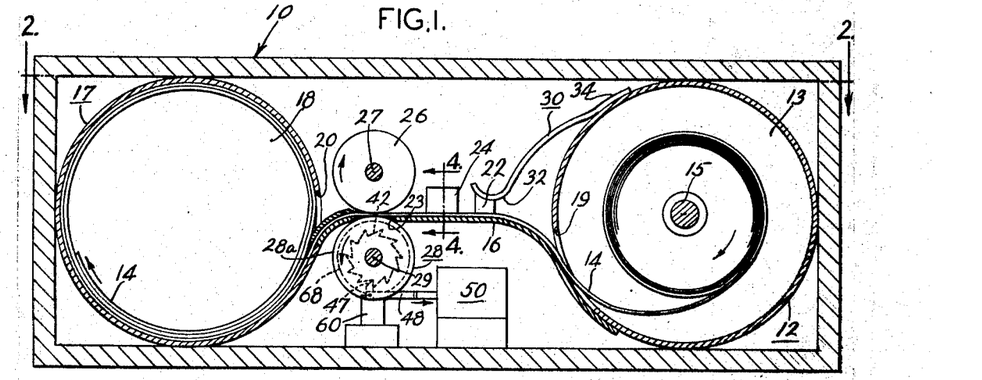
FIG. 1 is a sectional view of the recorder section of the present invention with a side panel of the housing removed.
Figure 2:
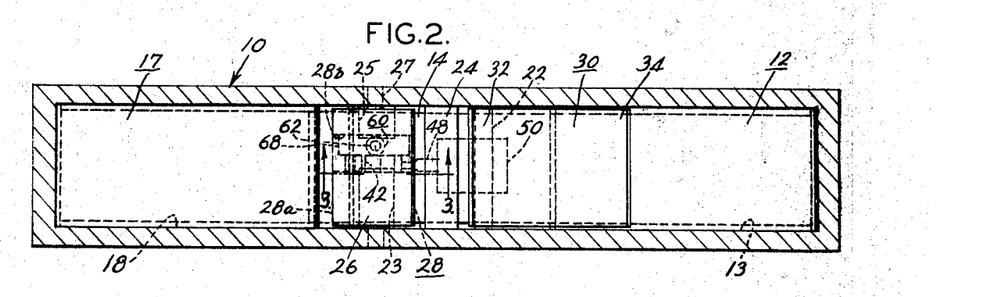
FIG. 2 is a sectional view of the recorder taken along line 2—2 of FIG. 1.

Referring to FIGS. 1 and 2, the recorder section may be housed in a casing generally designated 10. The casing houses a source of radiation sensitive material 12 comprising a generally cylindrical hollow container 13 having a generally rectangular opening 19 along its axial length, through which a radiation sensitive film 14 shown for example, photographic film 14 shown on spool 15 is removed from the source 12. The photographic film 14 is used for providing a permanent record of information supplied to the recorder.

The photographic film 14 is fed from source 12 through opening 19 along guide path 16 and into receptacle 17. Receptacle 17 comprises a generally cylindrical hollow container 18 having a generally rectangular opening 20 along its axial length through which the film enters the receptacle. As the film 14 moves along the guide path, it passes under pressure plate 22, recording head 24, and between rollers 26 and 28. Roller 28 on shaft 29 has two portions 28a and 28b which extend through slots 23 and 25, respectively, of guide path 16 to apply pressure against roller 26 on shaft 27. Pressure plate 22 in conjunction with rollers 26 and 28 serve as a tensioning means to maintain flatness of the film under recording head 24. The maintenance of flatness of the film is accomplished by having the rollers turn to move the film along the guide path after having passed under pressure plate 22 which is biased against the film by leaf spring 30, which has one end 32 curved to accommodate pressure plate 22 and the other end 34 secured to container 13, as by spot welding.

The drive means for moving roller 28 to advance the film along guide path 16 under recording head 24 and into receptacle 17 is provided by the mechanism for turning a ratchet wheel 42 fixed on shaft 29 to which roller 28 is also affixed. As can be seen in FIG. 2, ratchet wheel 42 is located between the two portions 28a and 28b of roller 28. The film is pressed between rollers 26 and 28 so that as roller 28 is rotated by shaft 29, the movement of the film by roller 28 will rotate roller 26.

The film is advanced through the recorder in a stepwise and discontinuous manner. The step-wise movement of roller 28 is accomplished by pawl 47 and plunger 48 driven by solenoid 50 to move ratchet wheel 42. In the preferred embodiment of the present invention, solenoid 50 comprises a short-stroke miniature solenoid. The miniature solenoid may be of the type being manufactured by the Tec Magnetics Company of Downey, Calif. As is well known, considerable force can be developed with only a small amount of power applied to such a device. This is particularly true when utilizing short-stroke miniature solenoids with a coned plunger or a flat plunger with air gaps. Accordingly, a miniature solenoid as described above can be built having dimensions of ⅜ inch long, $\frac{7}{16}$ inch high, and $\frac{5}{16}$ inch wide and requiring a peak drive power of on the order of one to three watts to operate the recorder of the present invention. Further, this amount of power need only be applied for approximately 50 milliseconds to effectuate the necessary movement to advance the ratchet. If readings are made ten times per hour, the average drive power requirement for the solenoid is on the order of $1.4 \times 10^{-3}$ watts.

Figure 3:
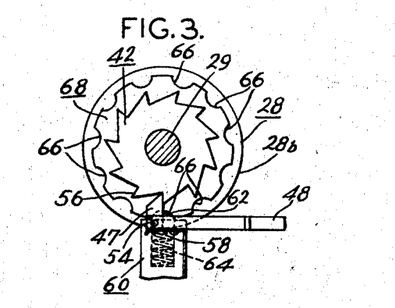
FIG. 3 is an enlarged view taken along line 3—3 of FIG. 2.

In operation of the mechanism for turning ratchet wheel 42, pawl 47 is adapted to advance ratchet wheel 42 one tooth for every movement of the plunger 48 through a complete cycle. As can be seen in FIG. 3, at one end of plunger 48 the pawl 47 pivoted about pin 54 is provided for engaging the teeth on ratchet wheel 42. When solenoid 50 is energized, plunger 48 is drawn inwardly into the center of the solenoid, advancing the ratchet wheel in a counterclockwise direction. When the solenoid is deenergized, plunger 48 is moved outwardly from the center of solenoid 50 and pawl 47 is pivoted in a clockwise direction about pin 54 by its contact with the following tooth of the ratchet wheel. For example, in FIG. 3 tooth 56 on ratchet wheel 42 would depress pawl 47 when plunger 48 moves outwardly from the center of solenoid 50 to have the pawl on the plunger be in the proper position to engage tooth 56 to move ratchet wheel 42 in a counterclockwise direction on the next energization of the solenoid. The pawl on the plunger is returned to its vertical position to engage the teeth on ratchet wheel 42 by plate spring 58 attached to the plunger. By this arrangement, the pawl is positioned to engage the teeth of the ratchet wheel to advance it in a counterclockwise direction when the solenoid is energized.

In order to prevent ratchet wheel 42 from turning shaft 29 in a clockwise direction when the pawl presses against the teeth of the ratchet wheel as the plunger moves outwardly from the center of the solenoid to its rest position, detent 60 is provided. Detent 60 also serves the function of fixing the amount of movement of the film for each single actuation of the plunger to move the ratchet wheel. Here each position of the detent corresponds to a one tooth advancement of the ratchet wheel. As may be seen in the enlarged view of the detent in FIG. 4, the detent has a ball 62 urged upwardly by spring 64 to engage sockets 66 of wheel 68 which rotates with shaft 29. The ball engaging the sockets of wheel 68 prevents clockwise rotation of shaft 29 upon engagement of the pawl with the teeth of ratchet wheel 42 and fixes the amount of counterclockwise rotation of the ratchet wheel upon the pawl advancing it one tooth.

As has previously been explained, the shaft 29 is advanced step-wise in a counterclockwise direction of rotation, and hence roller 28 advances film 14 in a step-wise manner, the advancement being one tooth of the ratchet wheel for every movement of the plunger through a complete cycle. A complete cycle of movement of the plunger comprises energizing the solenoid to move the plunger to a position shown in FIG. 3, thereby advancing the ratchet wheel one tooth, and deenergizing the solenoid so that the plunger will move outwardly from the center of the solenoid to have the pawl be in a position to engage the following tooth on the ratchet wheel for moving the ratchet wheel in a counterclockwise direction when the solenoid is next energized. Thus, the movement of the film under the recording head is step-wise and discontinuous, since the solenoid must be deenergized between advancements of the film.

Figure 4:
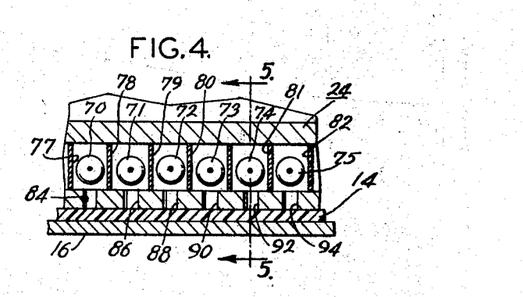
FIG. 4 is an enlarged fragmentary sectional view taken along line 4—4 of FIG. 1.
Figure 5:
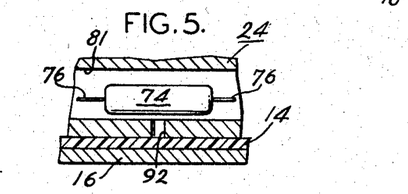
FIG. 5 is a fragmentary sectional view taken along line 5—5 of FIG. 4.

In accordance with another feature of the present invention, as shown in FIG. 4, the recording head 24 is provided with a plurality of light sources individually energized for exposing different discrete areas on photographic film 14 as it moves along guide path 16 for making a record on the film. More specifically, in the particular embodiment shown, the recording head individually houses an array of ultraminiature lamps, such as lamps 70, 71, 72, 73, 74 and 75. The ultraminiature lamps used in the recording head of the present invention may be ultraminiature incandescent lamps of the type being manufactured by the Kay Electric Company of New Jersey. The typical tubular diameter of such lamps is, for example, .016 inch, and the length of such lamp is .07 inch. FIG. 5 shows a side view of lamp 74 with electrical leads 76. The leads for the ultraminiature lamps may be connected through a system of electrical switches to the same source of power as used to energize solenoid 50. The system of switches is arranged to operate in a predetermined manner to energize different numbers of the lamps in response to different inputs of the apparatus.

The ultraminiature incandescent lamps referred to above have a low power requirement and a relatively rapid signal response. The lamps will light sufficiently to expose the film when only briefly energized. The lamps with their relatively rapid signal response may be arranged to utilize power only during a "read in" or "record" operation which may be made to correspond to the time at which the solenoid is energized to produce step-wise movement of the film beneath the recording head. Alternatively, if desired, the lamps may be energized to expose the film at any time after an actuation of the solenoid.

Referring again to FIG. 4, the lamps are housed in the recording head in individual compartments, such as lamp 70 in compartment 77, lamp 71 in compartment 78, lamp 72 in compartment 79, lamp 73 in compartment 80, lamp 74 in compartment 81, and lamp 75 in compartment 82. The recording head just clears the film surface as the film passes by the recording head on the guide path. The compartments which house lamps 70, 71, 72, 73, 74 and 75 have circular or other suitable openings 84, 86, 88, 90, 92 and 94, respectively, from the compartments to the film to provide a light path to the film from the lamps. By this arrangement each lamp exposes a different discrete area on the film.

In the illustrated embodiment of FIG. 4, the lamps are shown in a linear array transverse to the direction of movement of the film. Each lamp in the array is individually energized through a separate electrical switch to provide a digital record of information, as, for example, in the binary decimal code system of representing numbers. In this system the individual bits recorded by each lamp represents a specific coefficient which may be one or zero in the following binary series:

$$A_0Z^0 + A_1Z^1 + A_2Z^2 + A_3Z^3 + A_nZ^n$$

where A is one or zero, corresponding to the film being exposed or not exposed, respectively, and $Z^n$ is the value of the radix which may be a function, in this recorder, of the channel position on the film. The number of lamps needed depends on the number of terms in the series desired to be represented on film. The distance between the centers of the lamps in the compartments in FIG. 4 may be on the order of .033 inch. By this arrangement each light source in location corresponds to a separate channel on the film, and the lights expose bits of channels to make a representation of information at each "record" operation.

Sprocketless photographic film may be used in the recorder to provide an improvement in information capacity to be realized by providing a wider useful distance across the film. It should be understood that the selection of the radiation sensitive material will usually be a function of, for example, the radiation source used to expose areas of the radiation sensitive material, requirements of subsequent data handling, such as transfer of data to punch cards, and ambient radiation which may effect the recording medium.

Typical values of the number of lamps which may be used, the maximum binary value achieved, and the estimated usable channels associated with the binary system for the number of lamps provided, are shown associated with the type of film used in the table as follows:

FILM DATA CAPACITIES

| No. | Film type | Max. lamps | Max. binary value | Estimated useful channels |
|---|---|---|---|---|
| 1 | 8 mm. w/sprocket | 5 | $2^5 - 1$ (32) | 1-datum (accuracy 1:32) |
| 2 | 8 mm. no sprocket | 9 | $2^9 - 1$ ($5.12 \times 10^2$) | 1-datum (accuracy 1:128) 1-code (2 bits) or 1-datum (accuracy 1:512) |
| 3 | 9 mm. no sprocket | 10 | $2^{10} - 1$ ($1.024 \times 10^3$) | 1-datum (accuracy 1:128) 1-code (3 bits) or 1-datum (accuracy 1:1024) |
| 4 | 16 mm. w/1 sprocket | 13 | $2^{13} - 1$ ($8.19 \times 10^3$) | 2-data (accuracy 1:64) (accuracy 1:32) 1-code (2 bits) or 1-datum (accuracy 1:8200) |
| 5 | 16 mm. no sprocket | 18 | $2^{18} - 1$ ($2.62 \times 10^5$) | 2-data (accuracy 1:256) (accuracy 1:256) 1-code (2 bits) or miscellaneous |
| 6 | 35 mm. w/2 sprockets | 29 | $2^{29} - 1$ ($5.36 \times 10^8$) | 3-data (accuracy 1:1024) (accuracy 1:1024) (accuracy 1:128) 1-code (2 bits) or miscellaneous |

FILM DATA CAPACITIES

| No. | Film type | Max. lamps | Max. binary value | Estimated useful channels |
|---|---|---|---|---|
| 7 | 35 mm. no sprocket | 41 | $2^{41} - 1$ <br> $(2.199 \times 10^{12})$ | 5-data (accuracy 1:256) <br> (accuracy 1:256) <br> (accuracy 1:256) <br> (accuracy 1:256) <br> (accuracy 1:128) <br> 1-code (2 bits) <br> or <br> miscellaneous |

The above chart is based on use of lamps of the size and type previously described. However, for example, solid state radiation sources may be used, such as the avalanche luminescent diode of the type manufactured by Fairchild Semiconductor, Division of Fairchild Camera and Instrument Corp. of Mountain View, Calif. If such solid state sources are used a much larger digit capacity is possible because of the very small dimensions of the sources.

While the recorder section has been described with particular reference to a specific embodiment of the film source, film receptacle and driving rollers, it will be obvious to those skilled in the art that it may be embodied in a large variety of forms averse from the one specifically shown and described. For example, the film source and receptacle may be provided by a standard Minox film cassette of the type manufactured by the Minox Company, Inc., of Wetzlar, West Germany. Each Minox cassette contains approximately 50.8 centimeters of film and the film width is 9 mm. wide. The Minox film provides up to 10 binary digits of recording capability, which would have the facility to indicate any number from 0 to 1024. Film advance with the Minox cassette would be accomplished by energization of a solenoid driving a ratchet wheel fixed on a sraft, which would engage the reel of the Minox cassette receptacle. The ratchet wheel and solenoid providing the drive means would operate as described above for moving roller 28, but in this instance would rotate the reel of the cassette receptacle. The detent and pawl arrangement would operate as described above. After all of the useful film of a cassette is used, it would be removed from the recorder and another similar cassette placed in the recorder with the reel of the receptacle of the new cassette coupled to the drive shaft, which is coupled to the ratchet wheel. Of course, other commercialy available cassettes could be employed, such as the Minolta cassette manufactured by the Minolta Camera Co., Limited, of Osaka, Japan. In a recorder apparatus employing a standard cassette, the recording head would be positioned between the film source and film receptacle of the cassette and arranged so that the film would pass adjacent the recording head.

Figure 6:
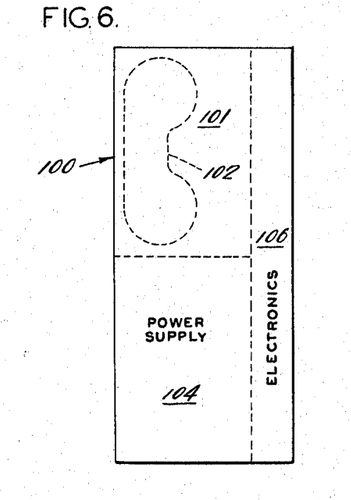
FIG. 6 is a schematic diagram of an overall housing arrangement of a recorder apparatus in accordance with the present invention.

In FIG. 6 there is shown a schematic diagram of an overall housing arrangement 100 for the recorder apparatus and showing dashed lines to indicate the division between the three main portions of the apparatus. More specifically, the recorder section is generally designated 101 and includes a film cassette 102, a power supply section 104 and an electronic circuitry section 106. The power to operate the apparatus may be provided by a small battery or solar cells charging capacitive means which are discharged to provide the power for the recorder apparatus. The housing shown in FIG. 6 indicates the actual size of one form of the recorder apparatus which may be 3.9 inches long, 1.7 inches wide and 0.8 inch thick. Depending on the size of the power cell and electronic circuitry required for a particular application, the housing may be made smaller as indicated in FIG. 7.

Figure 7:
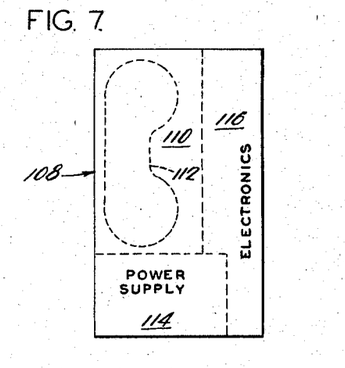
FIG. 7 is a schematic diagram of another overall housing arrangement of a recorder apparatus in accordance with the present invention.

In FIG. 7 a housing 108 has a recorder section 110 with a cassette 112, a power supply section 114 and an electronic section 116. The overall actual size of the housing may be 2.7 inches long, 1.6 inches wide and 0.8 inch thick. The recorder apparatus of the present invention may be made very small so that it can be easily and conveniently carried by a vehicle, person or animal, for example, for making recordings of a predetermined condition while other activity is taking place. Preferably, the housing for the recorder apparatus would have separate compartments as indicated in FIGS. 6 and 7 which may be separately accessible for servicing or direct replacement of any component of a section or of the entire section. As previously stated, the size of the housing may vary depending on the power needed to be supplied by the power supply section. The total system power requirement will vary in accordance with the number and size of the lamps employed, size of the solenoid, the complexity of the electronic circuitry, the recording interval, and the temperature of the environment in which the recorder is placed for recording informaiton relative to a predetermined condition.

Figure 8:
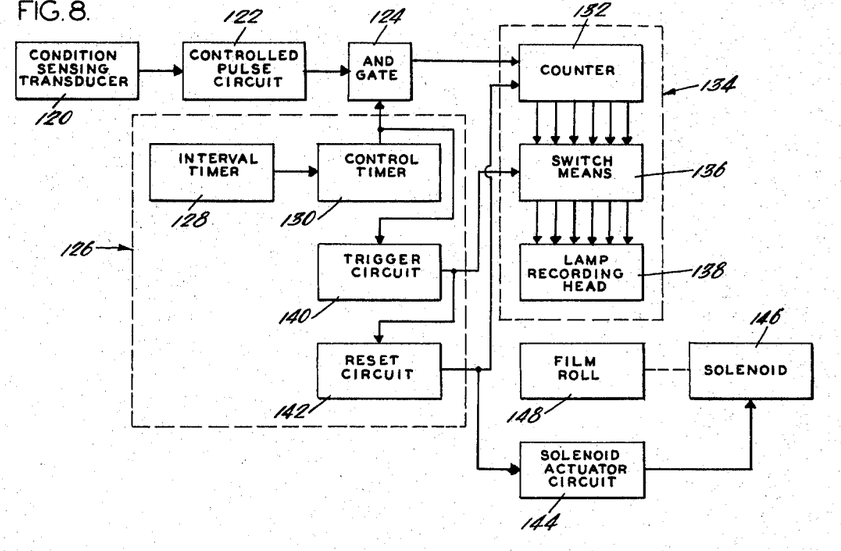
FIG. 8 is a block diagram illustrating the electronic circuitry for operating the recorder section of the invention.

The block diagram of FIG. 8 illustrates one form of the electronic circuitry for operating the recorder section of the recorder apparatus. The electronic circuitry section of the reorder apparatus in the embodiment shown in FIG. 8 comprises a condition sensing transducer 120 which is responsive to a predetermined condition for producing an output signal indicative of the condition. The condition sensing transducer may convert a sensed condition to, for example, a variable resistance, or, for example, sense a pulsatile voltage or a direct voltage current. Where the transducer provides a variable resistance electrically connected in the circuitry of the recorder, the resistance may be representative of a variation which is proportional to mechanical motion or force, which is desired to be detected and recorded. The variable resistance may be provided by a light sensitive photoconductor detecting a light level in a particular ecology or detection of the illuminescent level of a radiation source, for example. The variable resistance may be a thermistor employed as a temperature sensor for sensing the temperature of the human body, for example. A condition sensing transducer for sensing a pulsatile voltage may be used, for example, in sensing heart rate. A transducer sensing a direct voltage or current, which may arise from the galvanic skin reflex of a human subject, for example, may be used.

The condition sensing transducer 120 is connected to a controlled pulse circuit 122 which is responsive to the output signal of the transducer for providing a series of pulses indicative of the condition sensed. The controlled pulse circuit would be provided by different conventional circuit arrangements depending on the input thereto from the transducer in order to provide the series of pulses indicative of the input from the transducer. For example, if the transducer provides a variable resistance responsive to the condition sensed, the controlled pulse circuit may be provided by a blocking oscillator, wherein the variable resistance of the transducer would provide the resistance of the resistance-capacitance in the bias network of the oscillator so that the oscillator circuit will pulse at the rate which is related to the value of the variable resistance.

If the input to the controlled pulse circuit from the transducer is a pulsatile voltage, the controlled pulse may be provided by a conventional amplifier and pulse shaper circuit arrangement. If the input to the controlled pulse circuit is a direct voltage from the transducer, the controlled pulse circuit may be provided by a conventional blocking oscillator responsive to a varying direct voltage input, which is used to control the pulse repetition frequency of the oscillator. If the input voltage is of a very low level, an amplifier may be provided in the controlled pulse circuit for providing the necessary level of voltage input for proper blocking oscillator circuit operation.

The output of the controlled pulse circuit is supplied to an AND gate 124 which has its other input supplied from a control circuit means generally designated 126 in FIG. 8. The AND gate 124 has the characteristic of giving an output when both inputs are supplied with a signal from the controlled pulse circuit 122 and the control circuit means 126, respectively.

The control circuit means 126 includes an interval timer 128, which determines when a record of information relative to the condition sensed will be made. The recorder apparatus can be designed to operate making records of information at periodic intervals. If a record is desired to be made once every ten minutes, for example, at the end of each ten minute period the interval timer will emit an electrical pulse to activate the other circuitry of the control circuit means 126. The interval timer can be provided by any of a number of conventional timer circuits depending on the accuracy required in a particular application. For example, the timer may consist of an Accutron unit as manufactured by the Bulova Watch Company which can be wired to produce an electrical pulse at desired intervals. Such Accutron units are available commercially and are small and lightweight and require only a small amount of power for operation. If a less accurate interval timer may be satisfactory, a conventional astable multivibrator timing circuit may be employed.

The output pulse from interval timer 128 is supplied to a control timer 130 to activate the control timer which determines the period of time during the interval in which information is accumulated relative to the predetermined condition. Control timer 130 is actuated to provide an output signal for a predetermined period of time, in response to the signal from the interval timer, during which data is collected and then the control timer returns to its initial state until the next interval for a recording occurs and another signal is received from interval timer 128. The control timer may be provided by a monostable multivibrator circuit adapted to stay in its unstable condition providing an output signal during the period of time in which information concerning the condition is to be accumulated. The output of control timer 130 is supplied to AND gate 124, and the signal from the control timer, in effect, opens the AND gate to the series of pulses from the controlled pulse circuit 122, so that the output of the AND gate is a series of pulses having a frequency as received from the controlled pulse circuit, and the number of pulses of the series accumulated during the sampling period being indicative of the condition sensed.

The output of AND gate 124 is supplied to a counter 132, which is part of the digital recording portion 134 of the circuitry arrangement of FIG. 8. Counter 132 is preferably a binary counter which includes a series of interconnected binary stages with a single input from AND gate 124. The output of each binary stage (6 binary stages being indicated by the output leads from the counter in FIG. 8) is supplied to switch means 136, which upon actuation of its control means connects each of the outputs of the binary stages to different ones of the lamps in lamp recording head 138. The signal for actuating the control means of switch means 136 is supplied from the control circuit means 126, as will be explained hereinafter.

When the period for monitoring the predetermined condition terminates for the particular interval, the control timer 130 terminates providing an output signal supplied to AND gate 124, so that further pulses from the controlled pulse circuit are not passed through AND gate 124 to the counter.

The output of control timer 130, in addition to being supplied to AND gate 124, is also supplied to a trigger circuit 140. The trigger circuit is responsive to termination of the output signal of control timer 130, or the trailing edge of the output signal of the control timer, so that the trigger circuit operates immediately upon AND gate 124 ceasing to pass pulses from the controlled pulse circuit 122 to counter 132. The trigger circuit 140 may be provided by a conventional monostable multivibrator which provides an output signal when actuated to its unstable state and remains in its unstable state for a desired period of time. The output signal of the trigger circuit is supplied to switch means 136, which then connects the outputs of the counter to different ones of the lamps for representing information indicative of the condition sensed by the transducer through exposure of the film when the lamps are illuminated. In the types of lamps specified above, the thermal inertia is very low so that 5 milliseconds electrical pulse supplied to the lamp is of sufficient duration to provide adequate illumination of the lamps in exposing the film. The output signal of the trigger circuit is also supplied to a reset circuit 142, which is designed to be responsive to the termination of the output signal from the trigger circuit. The reset circuit which detects and is operated by the termination of the signal from the trigger circuit may be provided by the same type circuit as provides the trigger circuit, that is, a conventional monostable multivibrator circuit which provides an output signal in its unstable state. The output signal from the reset circuit is supplied to each binary stage of counter 132 to effect clearing or reset of the counter to its initial condition for receiving a new series of input pulses.

The reset circuit 142 also has its output supplied to a solenoid actuator circuit 144, which may be responsive to the termination of the output signal of the reset circuit 142. The solenoid actuator circuit produces a signal for actuating solenoid 146 to effect an incremental movement of film roll 148. The solenoid actuator circuit may be provided by another monostable multivibrator circuit, similar to the one which may provide the reset circuit, and additionally may include an emitter follower amplifier to ensure an adequate supply of current for proper operation of the solenoid in moving the film as previously described.

Figure 9:
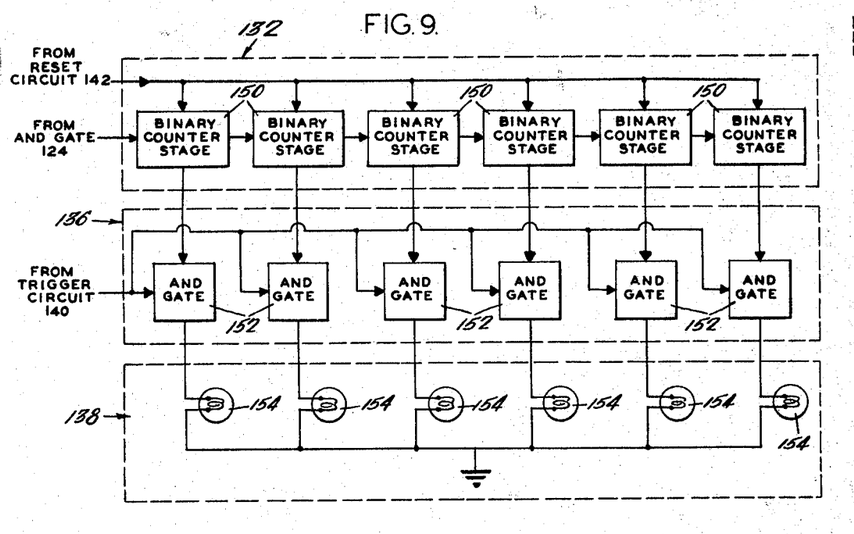
FIG. 9 is a schematic diagram illustrating in more detail a portion of the electronic circuitry of FIG. 8.

The digital recording portion 134 of the recorder circuitry of FIG. 8 is shown in more detail in FIG. 9. In FIG. 9, the counter 132 is shown comprising a number of binary counter stages 150, in the illustrated embodiment six binary counter stages are shown. The switch means circuit 136 is shown as comprising a plurality of AND gates each designated 152, the same number of AND gates being employed as binary counter stages. The lamp recording head generally designated 138 comprises a plurality of lamps each designated 154, the number of lamps being the same as the number of binary stages, in this instance, six lamps are provided.

The binary counter stages designated 150 operate in a conventional manner from a single input from AND gate 124 and count each pulse in the series of pulses from the AND gate for providing a series of outputs, one output from each binary stage, which are representative of the number of pulses in the series supplied to the counter. The output of each binary counter stage 150, whether having a signal or no signal, is supplied to different ones of the AND gates 152.

At the appropriate time the output signal from the trigger circuit 140 is supplied to each of the AND gates 152 for permitting each AND gate to provide an output representative of the output of its associated binary counter stage. If a signal is supplied from an associated binary counter stage to a particular AND gate, when a pulse is received from the trigger circuit 140, the associated lamp 154 connected with the particular AND gate will be energized making an appropriate digital record representative of a binary number. It should be appreciated that the number of binary stages, associated AND gates and lamps employed will depend on the number of lamps which may be provided in the recording head as determined by the particular type of film employed.

In FIGS. 8 and 9, six binary counter outputs for operating six associated lamps have been shown and described. If more lamps may be employed with the film used, each additional binary counter stage, associated AND gate and lamp would be iterative of a binary counter stage, AND gate and lamp arrangements shown in FIG. 9. The maximum number of lamps which may be used in accordance with the present invention with particular film types has been illustrated previously in the chart entitled, "Film Data Capacities." For example, with nine millimeters, no sprocket, film of a Minox cassette, ten lamps could be employed and each lamp would have an associated AND gate 152 and binary counter stage 150.

After the signal has been received from the trigger circuit 140 to actuate each of the AND gates 152, a signal is supplied to each binary counter stage 150 from reset circuit 142 for actuating the binary counter stages to their initial condition for being responsive to counting a new series of pulses at the next interval of recording. Each pulse from the interval timer actuates a new period for making a record of the condition sensed, which is indicated by the series of pulses counted by the counter and recorded on the film by illumination of the lamps. Also, between each recording, the film is stepped to a new position to present an unexposed portion of the film beneath the recording head for the next recording. This cycle repeats itself in accordance with the programming of the interval timer.

It should be understood that if automatic operation of the recorder is not required, the system of FIG. 8 may be provided with manually actuatable switch means. In such an instance, the control circuit means as shown would not be required, and there would be substituted, for example, control means including a manually actuatable switch for AND gate 124, manually actuatable ganged switches for AND gates 152 of switch means 136, and a manually actuated pulse circuit for producing a signal to reset the counter and pulse the solenoid to move the film. Depending on the particular application of the recorder apparatus, an accumulation period may not be required relative to a pulse rate to indicate information relative to the condition. For example, the recorder apparatus may be used to merely indicate the occurrence of an event relative to the existence of a condition, wherein a number of pulses occurring in a predetermined period is not required. Of course, an accumulation period could be determined by outside control means operating the manual switches to provide an accumulation period having significance relative to the condition sensed.

Figure 10:
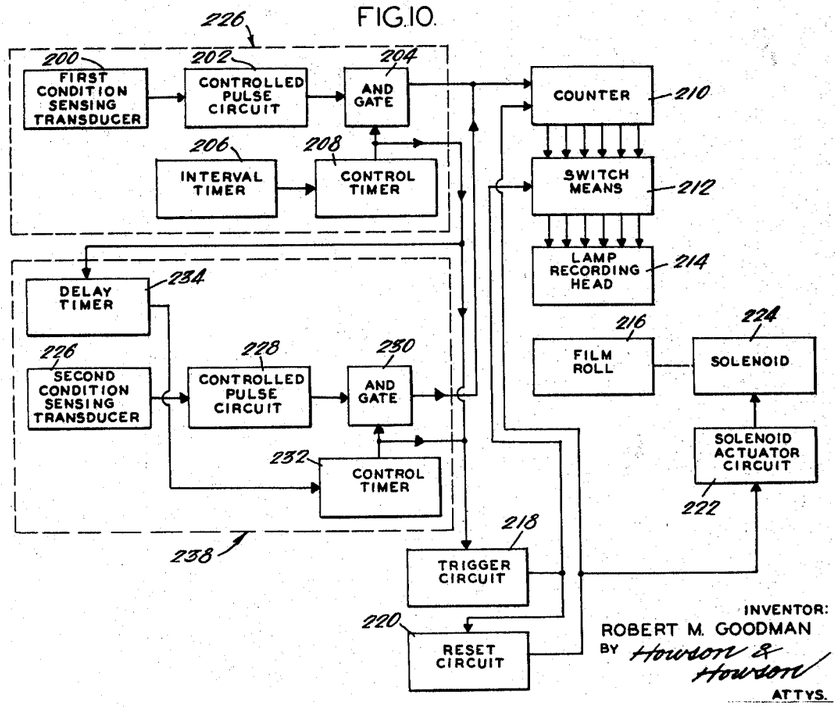
FIG. 10 is a block diagram illustrating electronic circuitry for operating the recorder apparatus with sequential recording of more than one sensed condition.

One form of circuitry for operating the recorder apparatus for recording information relative to more than one condition is shown in FIG. 10. The embodiment of the electronic circuitry for the recorder apparatus in FIG. 10 enables sequential recording of two different sensed conditions, such as, temperature and heart rate of a living person. The elements which make up the electronic circuitry of FIG. 10 are entitled similarly to the elements employed in FIG. 8, except for a delay timer which will be discussed hereinafter, and may be provided by the same general circuit components as specified for the elements of FIG. 8. The recorder apparatus schematically shown in FIG. 10 comprises a first condition sensing transducer 200 responsive to a first predetermined condition, such as heart rate, for producing an output signal indicative of heart rate supplied to a controlled pulse circuit 202. The controlled pulse circuit 202 in response to the signal from the first condition sensing transducer provides a series of pulses applied to one terminal of AND gate 204.

At an appropriate time, interval timer 206 will produce an output pulse to actuate a recording operation of information relative to the condition sensed. The signal from interval timer 206 is supplied to a control timer 208, which is responsive to the signal for providing an output signal supplied to the other input of AND gate 204, so that the AND gate passes the series of pulses from the controlled pulse circuit 202 to counter 210, in a manner as described in regard to FIG. 8. The series of pulses from AND gate 204 are processed by the counter which provides a series of outputs representative of the number of pulses in the series of pulses. The outputs of the counter 210 are supplied to switch means 212 which upon appropriate actuation connect each of the outputs to different lamps in lamp recording head 214 for representing a binary number on film roll 216.

After the appropriate period of time for collecting information relative to the first condition has passed, control timer 208 will terminate providing an output signal to AND gate 204 and no further signals will be supplied by AND gate 204 to counter 210. The output of control timer 208 is also connected to trigger circuit 218, which is designed to be responsive to the termination of the output signal of control timer 208 for actuating the trigger circuit to produce an output pulse. The output pulse of the trigger circuit is supplied to switch means 212 for actuating the switch means to connect the outputs of counter 210 to different ones of the lamps in lamp recording head 214 for representing the binary number indicative of the first sensed condition. The output pulse of trigger circuit 218 is also supplied to reset circuit 220, which preferably is responsive to the termination of the output pulse of trigger circuit 218 for causing the reset circuit to provide an output pulse. Reset circuit 220 has its output supplied to counter 210 for actuating the counter to its initial or reset condition preparatory for counting a new series of pulses and is supplied to solenoid actuator circuit 222, which produces an output signal of sufficient current to actuate solenoid 224 to mechanically advance the film on film roll 216 to present an unexposed portion under the recording head, as described in regard to FIG. 8.

The recorder apparatus of FIG. 10 also includes a second condition sensing transducer 226 for sensing another predetermined condition, such as, temperature, for producing an output signal indicative of the condition. A controlled pulse circuit 228 is responsive to the output signal of second condition sensing transducer 226 for providing a series of pulses indicative of the condition, in a manner as described in regard to FIG. 8. The series of pulses from the controlled pulse circuit 228 are supplied to one input of AND gate 230, which does not provide an output signal until a signal is concurrently received at its other input from control timer 232.

After the counter has processed the series of pulses from AND gate 204 representative of the first condition, the termination of the signal from control timer 208, which terminates the output signal from AND gate 204, is also supplied to delay timer 234, as well as being supplied to trigger circuit 218. Delay timer 234 may be provided by a monostable multivibrator circuit having a period for its nonstable state equal to the time required for the signals representative of the first condition to be recorded on the film, the counter actuated to its reset or initial condition and the film moved to an unexposed portion beneath the lamp recording head. The output of delay timer 234 is supplied to control timer 232, which is preferably designed to be responsive to the termination of the output signal of the delay timer. The control timer 232, in response to the termination of the signal from the delay timer 234, provides an output signal to the other terminal of AND gate 230, thus permitting the AND gate to pass the series of pulses from controlled pulse circuit 238 to counter 210. The counter processes the pulses representative of the second condition to provide at its outputs the appropriate signals representative of the number of pulses in the series from AND gate 230.

The output of control timer 232 is also supplied to trigger circuit 218, which is responsive to the termination of output signal of control timer 232. When control timer 232 terminates providing an output signal, AND gate 230 ceases to provide an output signal and trigger circuit 218 is actuated to produce output pulse supplied to switch means 212 and reset circuit 220. Switch means 212 is responsive to the output pulse of trigger circuit 218 and connects the outputs of counter 210 to different ones of the lamps in lamp recording head 214 for exposing film in a pattern to provide a binary number indicative of the second condition. Reset circuit 220 is responsive to the termination of the output pulse of trigger circuit 218 for providing an output signal supplied to counter 210 for returning the counter to its reset or initial condition ready to process a new series of input pulses. The output signal of reset circuit 220 is also supplied to solenoid actuated circuit 222, which provides an appropriate signal of sufficient current to actuate solenoid 224 for advancing the film an incremental distance to provide an unexposed portion of the film under the recording head.

After the above-mentioned operation has occurred, the circuitry of FIG. 10 will be in its initial condition ready to again sequentially record another set of information relative to the first condition and second condition upon the interval timer producing another output pulse at a desired time for initiating another recording operation. It should be appreciated that the outputs of various elements have been schematically connected at common junctions with outputs of other elements for simplicity and that the outputs of common connected elements would be isolated from each other by any conventional means, such as diodes.

It should also be appreciated that the first condition sensing and timer portion designated 236 in FIG. 10 is similar to the arrangement shown in FIG. 8 and that the second condition sensing and timer portion 238 in FIG. 10 has been added to the circuitry of FIG. 8 to provide the circuit of FIG. 10. In a similar manner, further condition sensing and timer portions, similar to condition sensing and timer portion 238, could be added to the circuitry of FIG. 10 for sensing and information relative to the conditions would be recorded sequentially between intervals actuated by interval timer 206. The number of conditions which may be sensed and the interval for recording new information relative to the various conditions will differ with different applications of the recorder.

Figure 11:
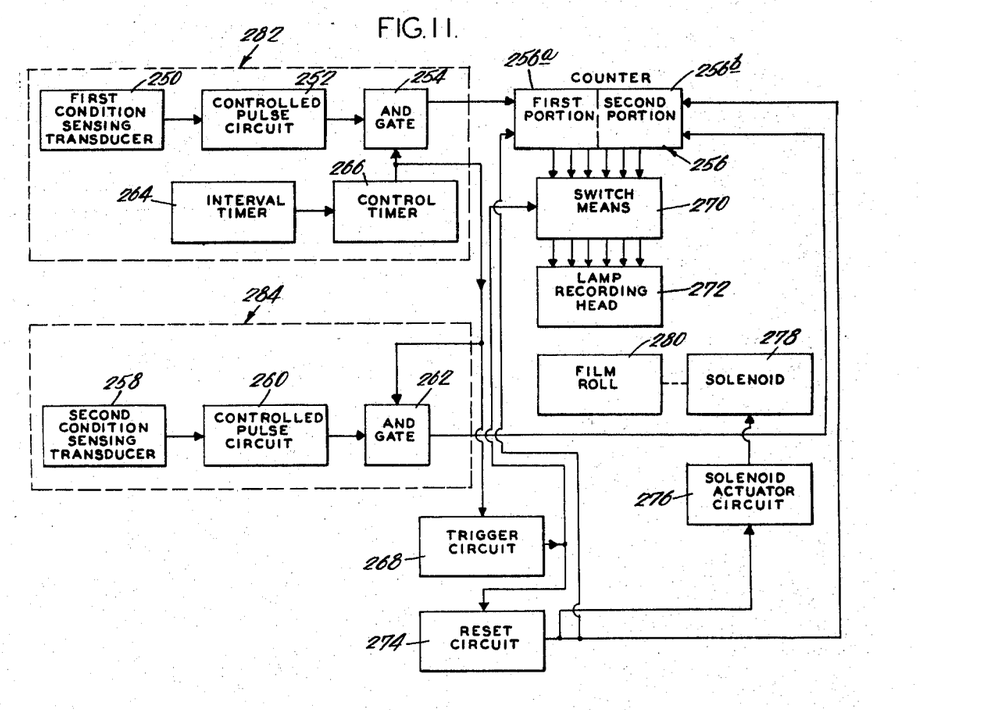
FIG. 11 is a block diagram illusrating electronic circuitry for operating the recorder apparatus with simultaneous recording of more than one sensed condition.

The recording apparatus of the present invention may be arranged to provide simultaneous recording of data relative to more than one predetermined condition. There is illustrated in FIG. 11 a block diagram of electronic circuitry for simultaneous recording of more than one sensed condition. The elements employed in the embodiment of FIG. 11 are entitled the same as the elements employed in FIG. 8, except for the counter which would have two distinct portions as will be explained hereinafter, and may be provided by the same circuit components as specified for the elements of FIG. 8.

The circuit arrangement shown in FIG. 11 comprises a first condition sensing transducer 250 responsive to a predetermined condition for providing an output signal indicative of the condition. The output signal of first condition sensing transducer 250 is supplied to controlled pulse circuit 252, which is responsive to the signal from transducer 250 for providing a series of output pulses indicative of the condition, which output pulses are supplied to AND gates 254. When AND gate 254 receives an appropriate signal at its other input, it will pass the pulses from controlled pulse circuit 252 to first portion 256a of counter 256. In this embodiment of the invention the counter has two portions each operable separately for counting pulses supplied to the specific portion. More specifically, counter 256 has a first portion 256a, which is responsive to pulses indicative of the first sensed condition for providing a series of outputs representative of the number of pulses of the series, and second portion 256b, which is responsive to pulses representative of another condition for providing a series of outputs indicative of the number of pulses in the series representative of the second condition.

The second condition is sensed by second condition transducer 258, which is responsive to another condition for providing an output signal indicative of the condition supplied to controlled pulse circuit 260. Controlled pulse circuit 260 in response to the signal provides a series of pulses indicative of the second condition, which are supplied to AND gate 262. When an appropriate signal is received at the other input of AND gate 262, the AND gate provides an output representative of the series of pulses from controlled pulse circuit 260, which is supplied to second portion 256b of counter 256.

At the appropriate time when a record is desired to be made of the conditions sensed, interval timer 264 will be activated to produce an output signal, which initiates a recording operation for a period of time determined by control timer 266. The control timer is responsive to the output signal of the interval timer for causing the control timer to produce an output signal governing the recording time. The output signal from control timer 266 is supplied to AND gate 254, which in response to the signal provides an output comprising a series of pulses representative of the series of pulses received from controlled pulse circuit 252 and is supplied to AND gate 262, which in response to the signal provides an output comprising a series of pulses representative of the pulses received from controlled pulse circuit 260. As long as the control timer provides an output supplied to AND gate 254 and AND gate 262, each series of pulses will be counted by the first portion and second portion, respectively, of counter 256 for providing a series of outputs from each portion representative of a binary number indicative of the number of pulses in the series.

The output of the control timer 266 is also supplied to trigger circuit 268, which is responsive to the termination of the output signal of the control timer for actuating the trigger circuit to produce an output pulse. Upon termination of the signal from the control timer, AND gate 254 and AND gate 262 cease to provide an output signal, thereby terminating the period for receiving information relative to the conditions. The output signal of trigger circuit 268 is supplied to switch means 270, which is responsive to the pulse, in effect, connect the outputs of the first and second portions of the counter to different ones of the lamps in recording head 272 for illuminating appropriate lamps to represent binary numbers indicative of the first and second conditions.

The lamps on one half of the recording head as shown in FIG. 4 could be used to represent the binary number indicative of the first condition and the other half of the lamps would be used to represent a binary number indicative of the second condition. A number of arrangements of different lamp numbers with various types of film with indications of some data channel possibilities has been set forth previously in the chart entitled "Film Data Capacities."

The output signal of the trigger circuit 268 is also supplied to reset circuit 274, which preferably is responsive to the termination of the output pulse from the trigger circuit for providing an output signal supplied to each portion of counter 256 for actuating the counter to its reset or initial state. The reset circuit also has its output supplied to solenoid actuator circuit 276, which is responsive to the signal from the reset circuit for providing adequate current to actuate solenoid 278 to advance film roll 280 an incremental distance to provide an unexposed portion of the film beneath the recording head. The sequence of operation described is repeated each time interval timer 264 produces an output pulse to actuate the recorder apparatus through another time period of receiving and recording information relative to the first and second conditions.

It should be appreciated that the condition sensing and timer section 282 of FIG. 11, together with the other circuitry indicated, except for the other condition sensing and timed section 284, is generally similar to the circuit arrangement of FIG. 8. With each additional condition to be sensed, an additional condition sensing and timer section, similar to condition sensing and timer section 284, will be provided, and the counter would have an additional portion which would be responsive to counting pulses indicative of the additional condition sensed. Of course, with this arrangement the lamp recording head would have its lamps divided into portions corresponding to the number of counter portions.

Figure 12:
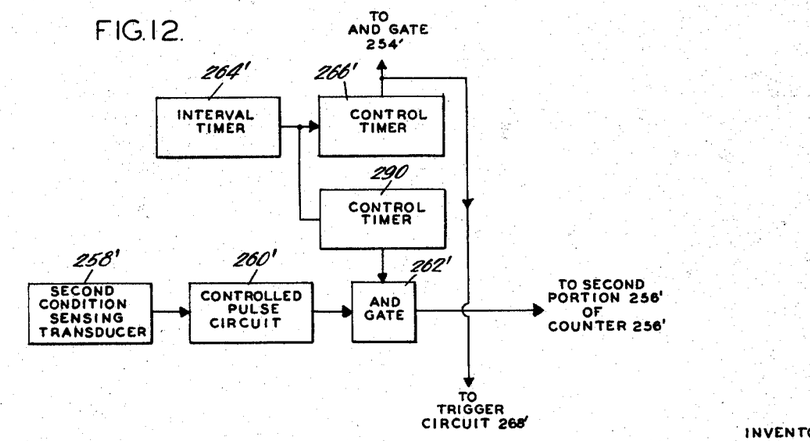
FIG. 12 is a schematic diagram illustrating an alternative arrangement of a part of the circuitry of FIG. 11.

It should be understood that the circuitry of FIG. 11 can be modified to provide for recording the first condition, for example, for a longer period of time than the second condition after the interval timer has activated a recording operation. Such a modification requires the addition of another control timer to operate with the second condition sensing and timer section 284. There is shown in FIG. 12 a modified circuit arrangement for a portion of the circuit of FIG. 11 to provide for receiving data relative to the conditions for different periods of time. In FIG. 12, parts similar to those of FIG. 11 are identified by the same number designators with the addition of primes thereto. In this instance, the output of control timer 266' is not connected to AND gate 262', but a further control timer 290 is provided, which is responsive to the output of interval timer 264' for providing an output connected to AND gate 262'. Control timer 290 in this example would provide an output signal for a lesser period of time than control timer 266', so that information relative to the second condition would be received for a shorter period of time. The signal supplied to the trigger circuit 268' would be from the control timer operating for the longest period, in this example control timer 266', to ensure that all data supplied to the counter would be processed and recorded.

As has previously been explained, the subminiature digital recorder apparatus operates or utilizes maximum power only during a recording operation. The solenoid is actuated to move the film to a new position under the recording head in response to a recording operation. The solenoid may be actuated after a recording operation as explained in regard to FIGS. 8, 10 and 11, or at the same time the lamps are illuminated, or, if desired, at the time the recorder apparatus is activated by the interval timer. The power requirements of the recorder apparatus are very small and maximum power is needed for only a brief period. For example, if ten lamps are employed, they require a total of 100 milliwatts of power during a recording operation, but the lamps need only be illuminated for 5 to 20 milliseconds during a recording operation. If a recording operation is desired to be made every thirty minutes, corresponding to the interval timer producing an output pulse once every thirty minutes, the average lamp power requirement would only be approximately $$100 \times 10^{-3} \times 10^{-5}$$

watts or approximately 1 microwatt. Similarly, if the drive solenoid were to require three watts of power, energization of the solenoid for fifty milliseconds during each thirty minute interval is sufficient and would require an average power of only approximately $0.83 \times 10^{-4}$ watts. With the small power requirements indicated, the power supply may be provided by small rechargable cells or mercury cells. Furthermore, if the recorder apparatus employs a Minox cassette as the film source, if the separation space on the film between recordings is made as large as 0.076 centimeter, approximately 670 data recordings may be made per cassette. If, for example, a recording is desired to be made once each hour (a typical requirement for certain oceanographic studies) approximately one month's data can be stored on the film of a standard Minox cassette. Data taken every five or ten minutes for studies involving heart rhythms may be made for two to four days, respectively, before a new cassette of film is required.

The subminiature digital recorder apparatus described above is primarily designed for use in applications where recordings are desired to be made at periodic or at random intervals. Also, it should be appreciated that the system of the present invention is designed for use in applications where small, lightweight and rugged equipment is desired and is particularly advantageous since only a small amount of power is required to operate the apparatus. Since the recorder apparatus is small and lightweight and requires only a small amount of power, the apparatus can be easily carried by a person or used on a space craft where space is limited and information is recorded of events which occur at random intervals awaiting further occurrences of the kind desired to be noted permanently.

I claim:

1. A recorder apparatus comprising:
   a source of radiation sensitive material,
   a receptacle for said radiation sensitive material,
   drive means for moving said radiation sensitive material from said source to said receptacle,
   a recording head having a plurality of radiation sources for exposing to radiation different areas on said material as said material moves from said source to said receptacle,
   transducer means responsive to a predetermined condition for producing an output signal indicative of said condition,
   controlled pulse means responsive to said output signal of said transducer means for providing a series of pulses indicative of said condition,
   counter means responsive to said series of pulses from said controlled pulse means for providing a series of outputs representative of the number of pulses in said series of pulses,
   switch means for selectively connecting said outputs of said counter means to different ones of said radiation sources for representing information indicative of said condition by exposure of said material and having means actuatable to cause said switch means to connect said outputs of said counter means to said radiation sources, and
   control means for actuating said actuatable means of said switch means and for actuating said drive means to move said material.

2. A recorder apparatus comprising:
   a source of radiation sensitive material,
   a receptacle for said radiation sensitive material,
   drive means for moving said radiation sensitive material from said source to said receptacle in a stepwise manner,
   a recording head having a plurality of radiation sources for exposing to radiation different areas on said material as said material moves from said source to said receptacle,
   transducer means responsive to a predetermined condition for producing an output signal indicative of said condition,
   controlled pulse means responsive to said output signal of said transducer means for providing a series of pulses indicative of said condition,
   counter means responsive to said series of pulses from said controlled pulse means for providing a series of outputs representative of the number of pulses in said series of pulses,
   switch means for selectively connecting said outputs of said counter means to different ones of said radiation sources for representing information indicative of said condition by exposure of said material and having control means actuatable to cause said switch means to connect said outputs of said counter means to said radiation sources, and
   control circuit means having timer means providing a signal to cause said control circuit means to actuate said control means of said switch means and to actuate said drive means to move said material.

3. The recorder apparatus of claim 2 in which said radiation sensitive material comprises photographic film.

4. The recorder apparatus of claim 2 in which said drive means comprises a ratchet wheel, a solenoid, a pawl actuated by said solenoid to move said ratchet wheel in a step-wise and discontinuous movement, and a shaft driven by said ratchet wheel to move said material from said source to said receptacle, said solenoid being responsive to signals from said control circuit means to have said pawl advance said ratchet wheel one tooth for each of said signals applied to the solenoid.

5. The recorder apparatus of claim 4 which further includes means for preventing reversal of movement of said ratchet wheel from the direction to have said radiation sensitive material move from said source to said receptacle, and for fixing the movement of said ratchet wheel to advance said material under said recording head to a distance of one tooth for each actuation of said solenoid.

6. The recorder apparatus of claim 5 in which said means for preventing reversal of movement of said roller and for fixing the movement of said ratchet wheel comprises a detent.

7. The recorder apparatus of claim 2 further comprising means for maintaining flatness of said radiation sensitive material when in position for being exposed by said recording head.

8. The recorder apparatus of claim 2 in which said recording head further comprises a plurality of compartments to individually house each of said plurality of radiation sources, and means defining an opening from each of said plurality of compartments to said radiation sensitive material passing by said compartments, whereby the radiation from said radiation sources exposes bits of channels defined by said radiation sources.

9. The recorder apparatus of claim 8 in which said plurality of radiation sources are arranged in a linear array traverse to the direction of movement of said radiation sensitive material by said drive means.

10. The recorder apparatus of claim 2 further comprising gate means connected between said controlled pulse means and said counter means and having gate control means actuatable to cause said gate means to connect said pulse means to said counter means, said control circuit means being connected to said gate control means for actuating said gate means.

11. The recorder apparatus of claim 10 in which said timer means of said control circuit means is adapted to provide an output signal for actuating the gate control means of said gate means for a predetermined period of time during which said counter means is responsive to said series of pulses.

12. The recorder apparatus of claim 11 in which the control means of the switch means is responsive to the output signal of said timer means for connecting the outputs of said counter means to said radiation sources.

13. The recorder apparatus of claim 11 in which said control circuit means includes trigger circuit means responsive to the output signal of said timer means for actuating said control means of said switch means.

14. The recorder apparatus of claim 13 in which said control circuit means further includes reset circuit means responsive to the output of said trigger circuit means for actuating the counter means to its initial state.

15. The recorder apparatus of claim 14 in which said control circuit means which actuates said drive means is provided by said reset circuit means.

16. The recorder apparatus of claim 10 in which said gate means comprises an AND gate.

17. The recorder apparatus of claim 2 in which said switch means comprises at least one AND gate circuit connected between one of the outputs of said counter means and one of said radiation sources.

18. The recorder apparatus of claim 11 further comprising second transducer means responsive to a second predetermined condition for producing a second output signal indicative of said second condition, second controlled pulse means responsive to said second output signal of said second transducer means for producing a second series of pulses indicative of said second condition, second gate means for connecting said second controlled pulse means to said counter means for having said counter means provide a series of outputs representative of the number of pulses in said second series of pulses and having gate control means actuatable to connect said second controlled pulse to said counter means, and delay timer means responsive to termination of the output signal of said first-mentioned timer means for providing a trigger signal to actuate said gate control means of said second gate means, said delay timer means being connected to said control circuit means for providing a signal to cause said control circuit means to actuate said control means of said switch means and to actuate said drive means to move said material.

19. The recorder apparatus of claim 18 further comprising reset circuit means responsive to the output of said control circuit means for actuating said counter means to its initial state.

20. The recorder apparatus of claim 2 further comprising second transducer means responsive to a second predetermined condition for producing a second output signal indicative of said second condition, second controlled pulse means responsive to said second output signal of said second transducer means for providing a second series of pulses indicative of said second condition; said counter means having a first portion and a second portion, said first portion being responsive to said series of pulses from said first-mentioned controlled pulse means for providing a series of outputs representative of the number of pulses in said first-mentioned series of pulses, said second portion of said counter means being responsive to said second series of pulses from said second controlled pulse means for providing a series of outputs representative of the number of pulses in said second series of pulses, said switch means connecting all of said outputs of said counter means to different ones of said radiation sources for representing information indicative of said first-mentioned condition and said second condition.

21. The recorder apparatus of claim 20 further comprising delay reset circuit means responsive to the output of said control circuit means for actuating said counter means to its initial state.

References Cited

UNITED STATES PATENTS

| | | | |
|---|---|---|---|
| 2,516,189 | 7/1950 | Dinsmore | 346—107 X |
| 2,899,673 | 8/1959 | Reiner | 340—173 |
| 3,069,682 | 12/1962 | Reese | 346—107 |
| 3,178,716 | 4/1965 | Slatin | 346—107 X |

RICHARD B. WILKINSON, *Primary Examiner.*

J. W. HARTARY, *Assistant Examiner.*

U.S. Cl. X.R.

346—34, 35